US011126709B2

(12) United States Patent
Furukawa et al.

(10) Patent No.: US 11,126,709 B2
(45) Date of Patent: Sep. 21, 2021

(54) SECURE MULTIPARTY COMPUTATION OF SHUFFLE, SORT, AND SET OPERATIONS

(71) Applicant: NEC Corporation Of America, Herzlia (IL)

(72) Inventors: Jun Furukawa, Tel-Aviv (IL); Kazuma Ohara, Kawasaki (JP); Toshinori Araki, Kawasaki (JP)

(73) Assignee: NEC Corporation Of America, Herzlia (IL)

( * ) Notice: Subject to any disclaimer, the term of this patent is extended or adjusted under 35 U.S.C. 154(b) by 325 days.

(21) Appl. No.: 16/258,715

(22) Filed: Jan. 28, 2019

(65) Prior Publication Data

US 2020/0242234 A1 Jul. 30, 2020

(51) Int. Cl.
| | |
|---|---|
| *G06F 21/51* | (2013.01) |
| *G06F 21/71* | (2013.01) |
| *H04L 9/08* | (2006.01) |
| *G06F 17/16* | (2006.01) |
| *G06F 7/08* | (2006.01) |

(52) U.S. Cl.
CPC ............... *G06F 21/51* (2013.01); *G06F 7/08* (2013.01); *G06F 17/16* (2013.01); *G06F 21/71* (2013.01); *H04L 9/085* (2013.01); *H04L 2209/46* (2013.01)

(58) Field of Classification Search
CPC .......... G06F 21/51; G06F 21/71; G06F 17/16; G06F 7/08; G06F 21/6245; H04L 9/085; H04L 2209/46
See application file for complete search history.

(56) References Cited

U.S. PATENT DOCUMENTS

| | | | | |
|---|---|---|---|---|
| 9,813,234 | B2 * | 11/2017 | Clark | ...................... H04L 9/085 |
| 2011/0060917 | A1 * | 3/2011 | Troncoso Pastoriza | ...................... G06F 21/76 713/189 |
| 2017/0359321 | A1 * | 12/2017 | Rindal | ................... G06Q 30/08 |

OTHER PUBLICATIONS

"Secure Multi-Party Computation"—Blanton et al, Department of Computer Science, University of Buffalo, 1019//2018 https://dl.acm.org/doi/pdf/10.1145/3243734.3264419 (Year: 2018).*

"Optimizing Semi-Honest Secure Multiparty Computation for the Internet"—Ben-Efraim et al, Dept. of Computer Science, Ben-Gurion University, ACM, Oct. 28, 2016 https://eprint.iacr.org/2016/1066.pdf (Year: 2016).*

* cited by examiner

*Primary Examiner* — Randy A Scott (57) ABSTRACT

A method for performing secure computations on records, comprising: receiving a request to apply a computation on a record; assigning a respective partial record of a plurality of partial records of the record to each of a plurality of computational processes; instructing each of the plurality of computational processes to perform a computation scheme comprising: applying a semi honest multiparty computation on the partial record; iteratively repeating a predetermined number of times: using a secure multiparty arithmetic computation to generate random terms; using the secure multiparty arithmetic computation to assign the random terms and an outcome of the application to at least one predetermined equation; verifying an integrity of the semi honest multiparty computation by comparison of the assignments to the at least one predetermined equation to at least one constant; and when the integrity is valid, combining the applications of the semi honest multiparty computations on the partial records.

7 Claims, 8 Drawing Sheets

SECURE MULTIPARTY COMPUTATION OF SHUFFLE, SORT, AND SET OPERATIONS

FIELD AND BACKGROUND OF THE INVENTION

The present invention, in some embodiments thereof, relates to an improvement of secure multiparty computation and, more specifically, but not exclusively, to an improvement of secure multiparty computation for shuffle, sort, and set operations. A Secure multiparty computation (SMPC) protocol is a protocol where computations are performed by a number of parties (also known as processes), such that each party is assigned a private partial input (also known as a secret share) of an input, of which parts of may be communicated with other parties in order to perform a computation, such that the result of the computations of the parties is equivalent to applying the computation to the input. SMPC protocols often depend on verifiable secret sharing (VSS) schemes, which strive to ensure privacy of inputs, such that each party cannot infer inputs of other parties, and correctness of computations, such that dishonest parties are detected by other parties during or after computations. SMPC protocols differ according to levels of security achieved, defined by two types of dishonest parties that may be present. One type being semi honest parties, meaning dishonest parties follow a protocol, where dishonest activity only includes information gathering, and a second type being malicious parties, meaning dishonest parties may actively deviate from a protocol in order to mislead honest parties. Practical applications of SMPC protocols include, among other areas, implementations of electronic auctions, electronic voting, and privacy-preserving data mining.

SUMMARY OF THE INVENTION

It is an object of the present invention to provide a system and a method for secure multiparty computation.

The foregoing and other objects are achieved by the features of the independent claims. Further implementation forms are apparent from the dependent claims, the description and the figures.

According to a first aspect of the invention, a method for performing secure computations on records, comprising: receiving a request to apply a computation on a record; assigning a respective partial record of a plurality of partial records of the record to each of a plurality of computational processes; instructing each of the plurality of computational processes to perform a computation scheme comprising: applying one of a plurality of semi honest multiparty computations on the partial record; iteratively repeating a predetermined number of times: using a secure multiparty arithmetic computation to generate random terms; using the secure multiparty arithmetic computation to assign the random terms and an outcome of the application to at least one predetermined equation; verifying an integrity of at least one application of the semi honest multiparty computations by comparison of the assignments to the at least one predetermined equation to at least one constant; and when the detected integrity is valid, calculating a response to the request by combining the applications of the semi honest multiparty computations on the partial records.

According to a second aspect of the invention, A system for performing secure computations on records, comprising: at least one computation component adapted to perform the following: receiving a request to apply a computation on a record; assigning a respective partial record of a plurality of partial records of the record to each of a plurality of computational processes; instructing each of the plurality of computational processes to perform a computation scheme comprising: applying one of a plurality of semi honest multiparty computations on the partial record; iteratively repeating a predetermined number of times: using a secure multiparty arithmetic computation to generate random terms; using the secure multiparty arithmetic computation to assign the random terms and an outcome of the application to at least one predetermined equation; verifying an integrity of at least one application of the semi honest multiparty computations by comparison of the assignments to the at least one predetermined equation to at least one constant; and when the detected integrity is valid, calculating a response to the request by combining the applications of the semi honest multiparty computations on the partial records.

With reference to the first and second aspects, in a first possible implementation of the first and second aspects of the present invention, wherein the record and each partial record comprise a matrix of predetermined size comprising elements of a finite algebraic field.

With reference to the first and second aspects, or the first implementation of the first and second aspects, in a second possible implementation of the first and second aspects of the present invention, wherein the secure multiparty arithmetic computation comprises a plurality of the following operations: a multiplication of an input by a scalar, a summation of two inputs, a multiplication of two inputs, and a comparison between two inputs;

With reference to the first and second aspects, or the first or second implementations of the first and second aspects, in a third possible implementation of the first and second aspects of the present invention, optionally, wherein the random terms are generated as randomly generated elements of the finite algebraic field and summations of randomly generated elements of the finite algebraic field multiplied by matrix entries of respective partial records.

With reference to the first and second aspects, or the first, second, or third implementations of the first and second aspects, in a fourth possible implementation of the first and second aspects of the present invention, optionally, wherein the computation scheme comprises a sorting multiparty computation as follows: applying a semi honest multiparty sorting computation on the partial record according to the preassigned index such that the sorting computation performs a sorting of matrix rows of the record according to a preassigned column index; iteratively repeating a predetermined number of times: using the secure multiparty arithmetic computation to generate random terms; assigning the random terms and an outcome of the application to a predetermined polynomial and a predetermined logical term; and verifying an integrity of at least one application of the semi honest multiparty computations by comparing the assignments to the predetermined polynomial to a first constant and by comparing the assignments to the predetermined logical term to a second constant.

With reference to the first and second aspects, or the first, second, third, or fourth implementations of the first and second aspects, in a fifth possible implementation of the first and second aspects of the present invention, wherein the computation scheme comprises a shuffle multiparty computation as follows: applying a semi honest multiparty shuffle computation on the partial record such that the shuffle computation permutes between respective partial record matrix entries of all computational processes; iteratively repeating a predetermined number of times: using the secure multiparty arithmetic computation to generate random terms; using the secure multiparty arithmetic computation to assign the random terms and an outcome of the application to a polynomial equation; and verifying an integrity of at least one application of the semi honest multiparty computations by comparing the assignments to the polynomial equation to a constant.

With reference to the first and second aspects, or the first, second, third, fourth, or fifth implementations of the first and second aspects, in a sixth possible implementation of the first and second aspects of the present invention, wherein the computation requested to be applied on the record is a distinct multiparty computation performed as follows: using the secure multiparty arithmetic computation to generate random terms according to a predetermined set of indices; assigning the random terms to respective matrix rows; applying the sorting multiparty computation on the partial record according to the assigned random terms; using the secure multiparty arithmetic computation to replace all combined assigned random terms with a first constant in a case that a consecutive combined random term is of equal value, and with a second constant in a case that a consecutive combined random term is of different value; applying the shuffle multiparty computation to the outcome of the application of the sorting multiparty computation with respective replaced assigned random terms to obtain an intermediate partial record; using the secure multiparty arithmetic computation to combine assigned random terms in the intermediate partial record; discarding all rows in the intermediate partial record for which respective combined random terms are equal to the first constant; using the secure multiparty arithmetic computation to output a combination of intermediate partial records;

With reference to the first and second aspects, or the first, second, third, fourth, fifth, or sixth implementations of the first and second aspects, in a seventh possible implementation of the first and second aspects of the present invention, wherein the computation requested to be applied on the record comprising two matrices is a union multiparty computation performed as follows: using the secure multiparty arithmetic computation to combine the two matrices into a combined matrix; using the distinct multiparty computation on the combined matrix; outputting the outcome of the distinct multiparty computation;

With reference to the first and second aspects, or the first, second, third, fourth, fifth, sixth, or seventh implementations of the first and second aspects, in an eighth possible implementation of the first and second aspects of the present invention, optionally, the computation scheme for each gate of the logical circuit which has a functionality of a multiplication of two inputs shares a total of six different encrypted terms by communication between computational processes.

With reference to the first and second aspects, or the first, second, third, fourth, fifth, sixth, seventh or eighth implementations of the first and second aspects, in an ninth possible implementation of the first and second aspects of the present invention, wherein the computation requested to be applied on the record is an intersect multiparty computation, and each partial record comprises a first matrix and a second matrix, performed as follows: applying a semi honest multiparty intersect computation on the partial record to obtain a third matrix; using the distinct multiparty computation on the first matrix; using the distinct multiparty computation on the second matrix; using the union multiparty computation on the first and second matrices to obtain a fourth matrix; applying a concatenate operation to an outcome of the distinct multiparty computation on the first matrix and an outcome of the distinct multiparty computation on the second matrix to obtain a fifth matrix; applying a concatenate operation to the third matrix and the fourth matrix to obtain a sixth matrix; and verifying an integrity by using the fifth matrix and the sixth matrix as respective input and output in the shuffle multiparty computation.

With reference to the first and second aspects, or the first, second, third, fourth, fifth, sixth, seventh, eighth, or ninth implementations of the first and second aspects, in a tenth possible implementation of the first and second aspects of the present invention, wherein the computation requested to be applied on the record is an except multiparty computation, and each partial record comprises a first matrix and a second matrix, performed as follows: applying a semi honest multiparty except computation on the partial record to obtain a third matrix; using the distinct multiparty computation on the second matrix; using the union multiparty computation on the first and second matrices to obtain a fourth matrix; applying a concatenate operation to the third matrix and an outcome of the distinct multiparty computation on the second matrix to obtain a fifth matrix; applying a concatenate operation to the third matrix and the fourth matrix to obtain a sixth matrix; and verifying an integrity by using the fourth matrix and the fifth matrix as respective input and output in the shuffle multiparty computation.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to an improvement of secure multiparty computation and, more specifically, but not exclusively, to an improvement of secure multiparty computation for shuffle, sort, and set operations. According to some embodiments of the present invention there are provided systems and methods in which computational processes perform secure computations on records in a shared manner, and in which the computational processes, also known herein as "processes", share information and perform computations according to a protocol such that processes do not reveal their respective inputs to each other, and any deviation from an accurate computation by any one of the processes results in a detection of the deviation by at least one of the other processes. A computation in a shared manner as described is known as a 'secure multiparty computation' (SMC). A computation in a shared manner for which dishonest parties are not necessarily detected, is known as a 'semi honest multiparty computation' (SHMC), wherein dishonest parties whose dishonest activities are limited to information gathering do not disrupt the protocol.

A method for secure multiparty computations in algebraic fields is described, where the method may be embodied to implement different computations. An embodiment of the method is hereby referred to as an 'SMC protocol' or 'SMC computation'.

Several SMC computations applied to finite algebraic fields are described, each for a respective computation comprising one of: shuffle, sort, distinct, union, intersect, and except. The protocols described are time efficient, and require less cost than alternative solutions for detecting malicious parties. The protocols described herein may be applied to relational database management systems, as relational databases often contain sensitive and/or private records, and in addition accessing relational databases, for example by structured query language (SQL), often involves set operations or arranging elements of a dataset.

A system for secure multiparty computation includes a code, which comprises instructions for managing a preprocessing of inputs, distribution of an outcome of the preprocessing to the processes, and post processing the processes outputs. In a preprocessing stage, the system may receive as input, a record, and/or a computation to be performed on the record. The computation may comprise one or more of the computations described herein by the respective protocols.

The input record is split in a random manner into a plurality of partial records as a number of processes participating in the computation, such that a combination of the plurality of partial records results in the record. A partial record is assigned for each process of a plurality of N processes, also known hereby as a 'secret share'. According to some embodiments of the present invention, the record and partial records comprise each of one or more matrices where each entry of the matrices consist of an element of a finite algebraic field.

Each process executes a computation scheme on a respective assigned partial record, wherein the computation scheme differs for the various SMC protocols.

The computation scheme executed by the plurality of processes uses a respective SHMC (such as SHMC shuffle, SHMC sort) as a 'black box' on the plurality of partial records, for which an outcome is then verified by repeating for a predetermined number of iterations an integrity verification comprising: using a secure multiparty arithmetic computation (SMAC) as a 'black box' to generate random terms consisting of a summation of randomly generated elements of a finite algebraic field multiplied by respective row entries of a partial record, using the SMAC to assign the random terms and an outcome of the SHMC to at least one predetermined equation, and verifying an integrity of the respective SHMC by comparing an outcome of the assignments to at least one constant. The predetermined number of iterations repeated may depend on a security parameter and the size of the finite algebraic field, in order to achieve an optional predefined probability that the respective SHMC integrity is correctly verified. Optionally, in order to increase probability of correctly verifying integrity of parties in the secure multiparty computations described herein, the predetermined number of iterations $\delta$ may be determined by choosing $\delta$ according to a security parameter k and $|\mathbb{F}|$, such that $|\mathbb{F}|^\delta > 2^{|k|}$. According to some embodiments of the present invention, the SMAC supports addition of two inputs, multiplication of an input by a scalar, multiplication of two inputs, and order comparison of two inputs according to the finite algebraic field.

According to some embodiments of the present invention, the shuffle SMC computation reassigns matrix entries of partial record of respective processes such that a combination (hereby also referred to as a 'reconstruction') of the partial records results in a random permutation of rows in a reconstruction of the record.

According to some embodiments of the present invention, the sort SMC computation receives as input an index, and reassigns matrix entries of partial record of respective processes such that a reconstruction of the partial records results in a sorting of rows in a reconstruction of the record according to a respective column index.

According to some embodiments of the present invention, the distinct, union, intersect, and except SMC's perform respective distinct, union, intersect, and except set operations by employing respective SHMC operations and the shuffle and sort SMC's.

The SMC's described herein may be used, for example, as part of a relational database system containing security sensitive information such as an information related to a financial institution, or a security installation, and may display advantages over existing solutions in terms of probabilities of detecting malicious parties and in time complexity of computations.

Alternative solutions for SMC's have been implemented, but display several disadvantages in comparison the SMC's presented herein. Reference is made to "Verifiable Secret Sharing and Multiparty Protocols with Honest Majority" by T. Rabin and M. Ben-Or. Published at STOC '89 Proceedings of the twenty-first annual ACM symposium on Theory of computing pp. 73-85 on May 17, 1989, which describes a protocol for secure multiparty computations that achieves semi-honest security, meaning the protocol described thereof is secure only when all parties follow the protocol. Reference is also made to "Multiparty Computation from Somewhat Homomorphic Encryption" by I. Damgard, V. Pastro, N. P. Smart, and S. Zakarias. Published at CRYPTO 2012 Proceedings of the 32nd Annual Cryptology Conference on Advances in Cryptology Volume 7417 pp. 643-662 on Aug. 23, 2012, which describes a protocol for secure multiparty computations that is secure against malicious parties which do not follow the protocol but requires significant computational complexity. Reference is also made to "Optimized Honest-Majority MPC for Malicious Adversaries—Breaking the 1 Billion-Gate Per Second Barrier" by T. Araki, A. Barak, J. Furukawa, T. Lichter, Y. Lindell, A. Nof, K. Ohara, A. Watzman, and O. Weinstein. Published at IEEE Symposium on Security and Privacy 2017 pp. 843-862 on Jun. 26, 2017, which describes a protocol for secure multiparty computations which is secure against parties which deviate from the protocol. The protocol can detect such deviations and terminate, however the protocol requires a large amount of computations shared among processes, and is feasible only when an amount of computations is very large, for example, the protocol would require at least four times the computational complexity in comparison to semi honest protocols.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
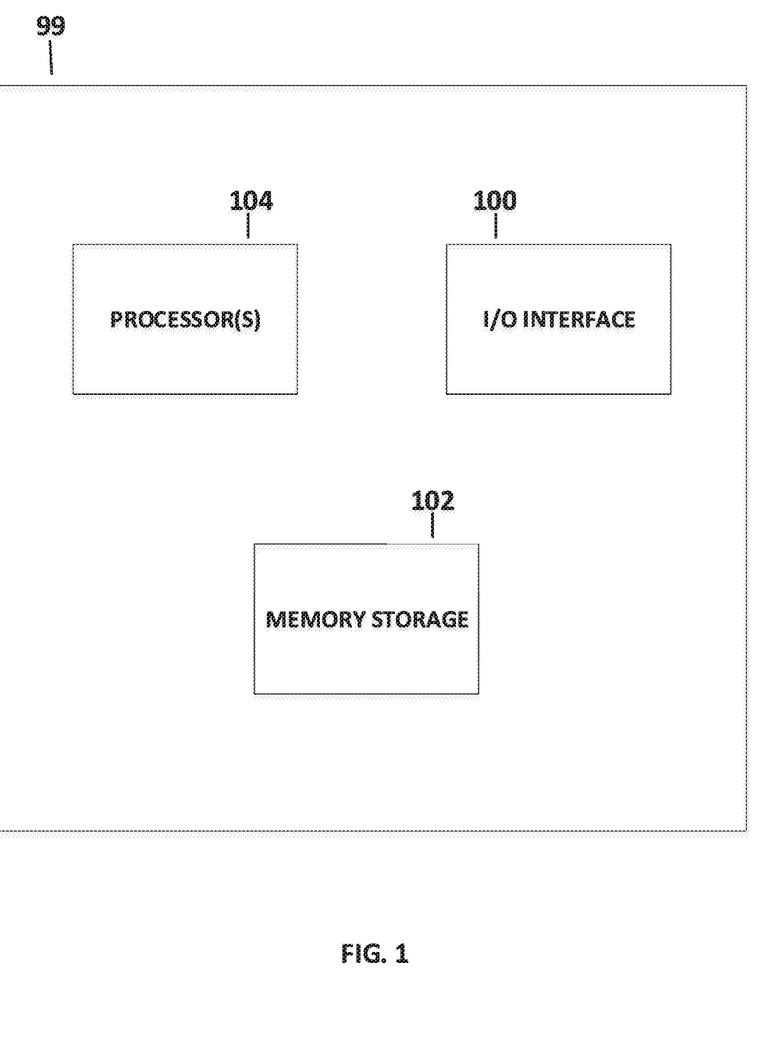
FIG. 1 is an exemplary layout of the various system components, according to some embodiments of the present invention.

Reference is now made to FIG. 1, which according to some embodiments of the present invention, depicts components of a secure multiparty computation system 99. The system is used for secure multiparty computations where computations involve arrangement of elements such as matrix rows, and set operations on elements, for example in processing relational database records.

System 99 includes an I/O interface 100 that receives records, arithmetic computations to be executed on respective records, and outputs the outcomes of secure multiparty computations. System 99 includes memory storage 102 for storing a code 102, partial and/or final computations originating during applications of computations to records. The code includes instructions for executing an arithmetic computation on received records, by initiating processes, assigning partial records to each process, and instructing each process how to perform a respective computation, System 99 includes one or more processor(s) 104 to execute the code. The system 99 may be used, for example, as part of a larger database management system as an addition and/or replacement subsystem for less efficient implementations or as a network service supplying services for efficient SMC's. System 99 may be implemented and firmware and/or software.

Figure 2:
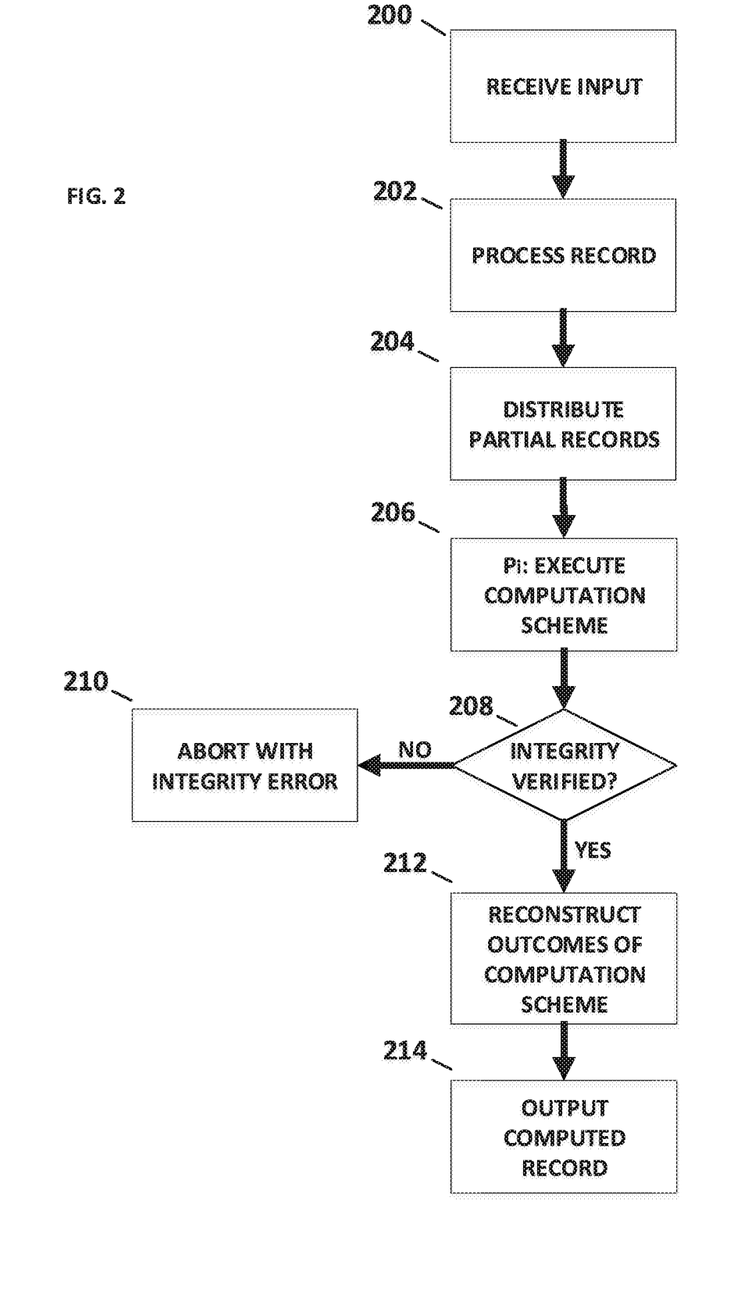
FIG. 2 is an exemplary dataflow of a secure multiparty computation on an input as executed by the code, according to some embodiments of the present invention.

Reference is also made to FIG. 2, which depicts a dataflow of a process of secure multiparty computation on an input, for example a process implemented when the code is executed by the one or more processors, according to some embodiments of the present invention. The method allows improving time complexity and security in relation to computations requirements on private and/or organizational sensitive data.

As shown in 200, an input is received by the I/O interface 100. The input may comprise of a record and/or a set of indices. As shown in 202, the record is processed by splitting the record randomly into distinct partial records, such that a reconstruction of the partial records results in the record. Hereby, a partial record of process $P_i$ is denoted by $((([x_{1,1}]_i, \ldots [_{1,k}]_i), \ldots ([x_{m,1}]_i, \ldots [x_{m,k}]_i))$, for i=1 ... N. As shown in 204, partial records and optionally the set of indices are distributed amongst the processes, such that each process is assigned a respective partial record. In one example, a record may consist of a sequence of bank account data, for various clients of a bank, and each partial record consists of a random part of each bank account data such that a sum of all partial records result in the record.

As shown in 206, each process, $P_i$, i=1 ... N, executes the computation scheme. Next, as shown in 208, the outcome of the computation scheme includes an integrity verification which is checked. If the integrity is not valid, then as shown in 210, the secure multiparty computation is aborted with an error output, and if the integrity is valid, then as shown in 212, a reconstruction of the computation scheme outputs of the processes, $P_i$, i=1 ... N, is executed and outputted as a computed record in 214.

Figure 3:
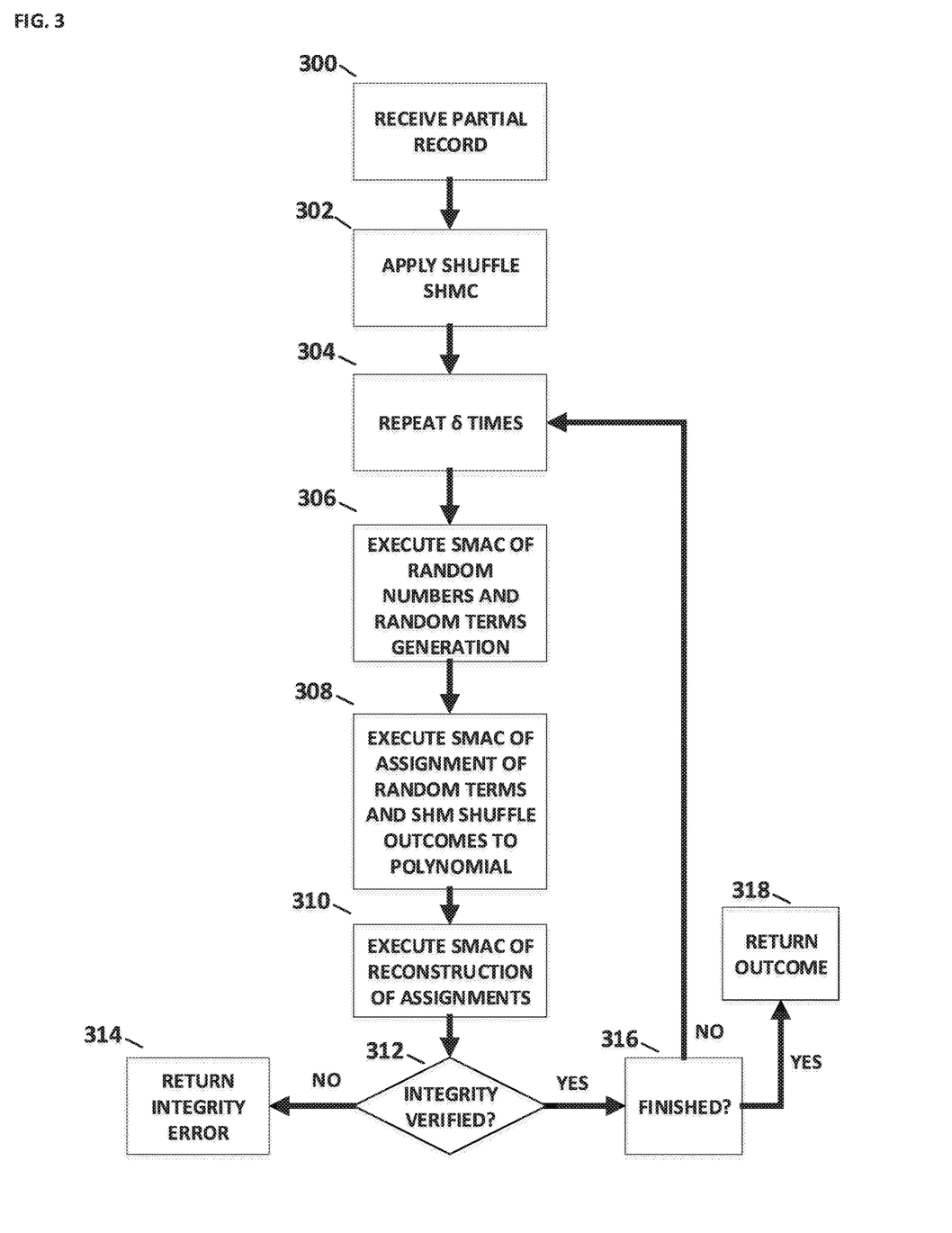
FIG. 3 is an exemplary dataflow of the shuffle multiparty computation, according to some embodiments of the present invention.

Reference is also made to FIG. 3, which depicts an exemplary dataflow of the computation scheme 206, implemented as the shuffle SMC, according to some embodiments of the present invention. As shown in 300, a respective partial record is received by each process, by execution of the code in 204. Next, as shown in 302, a shuffle SHMC is applied. According to some embodiments of the present invention, the shuffle SHMC uses as input a respective partial record from each process and each process is outputted a new partial record consisting of a k×m matrix denoted as $((([y_{1,1}]_i, \ldots [y_{1,k}]_i), \ldots ([y_{m,1}]_i, \ldots [y_{m,k}]_i))$, for i=1 ... N, such that a reconstruction of the new partial records results in a computed record comprising a random permutation of rows of the record.

Next, as shown in 304, an integrity verification process for the shuffle SHMC outcome is repeated for a predetermined number of times, denoted by δ, where δ may be predetermined according to the size of the finite algebraic field, denoted as $\mathbb{F}$, and optionally by predefined security requirements, such as a probability of detecting malicious parties, as a requirement for protecting organizational sensitive data. As shown in 306, k+1 random numbers of $\mathbb{F}$ are now generated by the processes using the SMAC for a purpose of reducing a probability of incorrectly invalidating the integrity and shuffle SHMC outcome. Denote the random numbers produced as $(\sigma_1, \ldots \sigma_k)$ and z. The random numbers are used as follows to construct random terms which are used in verifying an integrity of the shuffle SHMC.

The random terms comprise a summation defined as $[x'_j]_i = \Sigma_{l=1}^{k} \sigma_l [x_{j,l}]_i$, $[y'_j]_i = \Sigma_{l=1}^{k} \sigma_l [y_{j,l}]_i$, for j=1 ... m, for each process $P_i$, i=1 ... N, and are generated using the SMAC. According to some embodiments of the present invention, as shown in 308, the processes execute a SMAC of assigning a reconstruction of the random terms and the outcome of the shuffle SHMC to a polynomial defined as: $\Pi_{j=1}^{m}(z-[x'_j]) - \Pi_{j=1}^{m}(z-[y'_j]) = c$, where $[x'_j]$, $[y'_j]$, comprise reconstructions of $[x'_j]_i$, $[y'_j]_i$, i=1 ... N respectively.

Next, as shown in 310, the processes initiated by the code execute a SMAC in order to reconstruct c from their respective secret shares of c, in order to verify that c=0. If c=0, it is implied that with a certain probability the outcome of the shuffle SHMC is a row permutation of the record.

Next as shown in 312, if it is not verified that c=0 then as shown in 314, an integrity error is returned, else, as shown in 316 when an iteration number is less than δ a new iteration is executed, and when it is a final iteration then as shown in 318 an outcome is returned by each process comprising a respective shuffle SHMC output.

Figure 4:
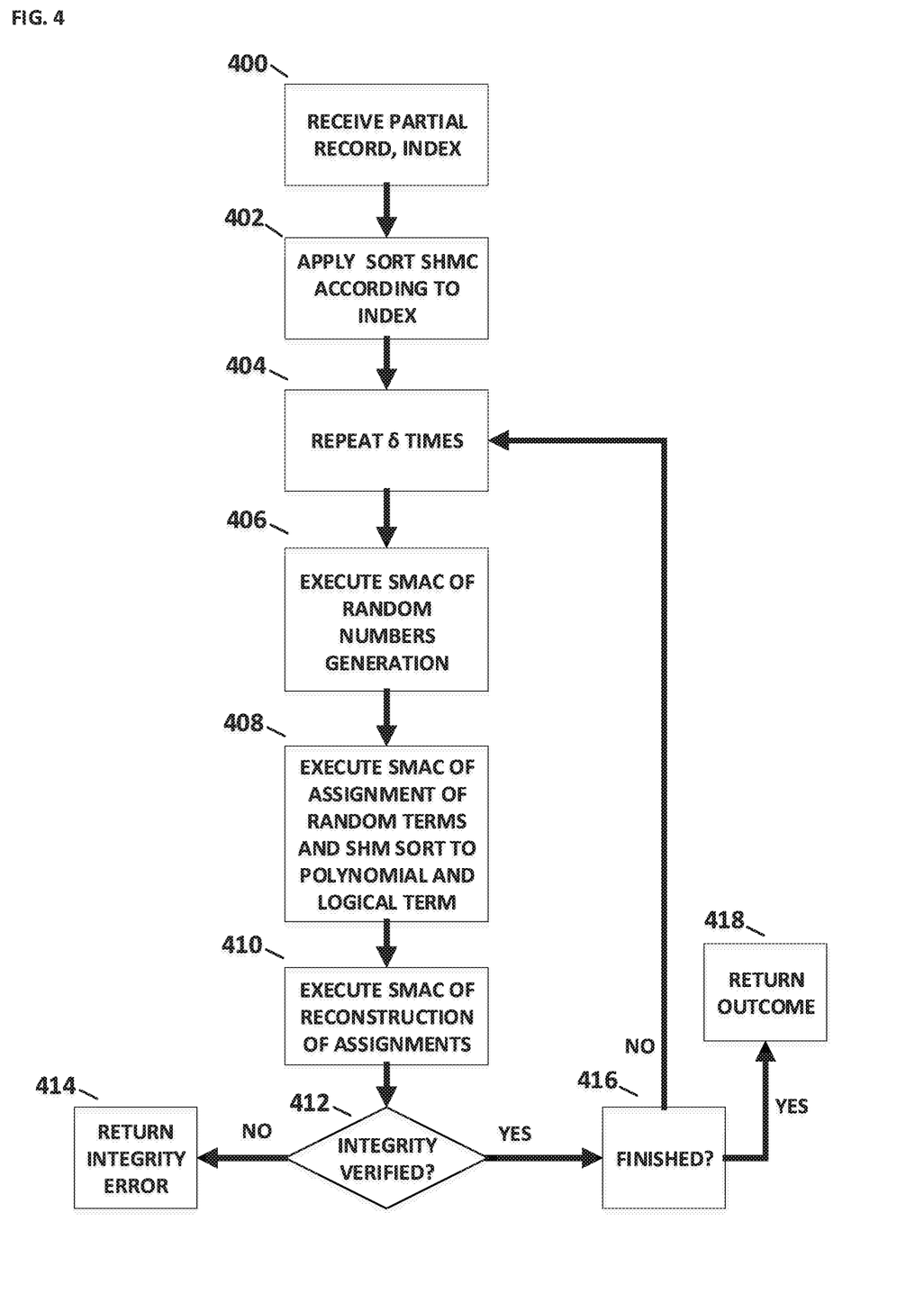
FIG. 4 is an exemplary dataflow of the sort multiparty computation, according to some embodiments of the present invention.

Reference is also made to FIG. 4, which depicts an exemplary dataflow of the computation scheme 206, implemented as the sort SMC. As shown in 400, a respective partial record is received by each process, by execution of the code in 204. In addition, an index I is received, which designates a matrix column by which the rows of the record are to be sorted. Next, as shown in 402, a sort SHMC is applied to the partial records according to index I. According to some embodiments of the present invention, the sort SHMC uses as input a respective partial record from each process together with index I, and each process is outputted a new partial record consisting of a k×m matrix denoted as $((([y_{1,1}]_i, \ldots [y_{1,k}]_i), \ldots ([y_{m,1}]_i, \ldots [y_{m,k}]_i))$, for i=1 ... N, such that a reconstruction of the new partial records results in a computed record comprising a sorting of the record according to values of a column with index I.

Next, as shown in 404, an integrity verification process for the sort SHMC outcome is repeated for δ number of times. As shown in 406, k+1 random numbers of $\mathbb{F}$ are generated by the processes using the SMAC for a purpose of reducing a probability of incorrectly invalidating the integrity of the sort SHMC outcome. Denote the random numbers produced as $(\sigma_1, \ldots, \sigma_k)$ and z.

Optionally, the random terms comprise a summation defined as $[x'_j]_i = \Sigma_{l=1}^{k} \sigma_l [x_{j,l}]_i$, $[y'_j]_i = \Sigma_{l=1}^{k} \sigma_l [y_{j,l}]_i$, for j=1 ... m, for each process $P_i$, i=1 ... N, and are generated using the SMAC. According to some embodiments of the present invention, as shown in 408, the processes execute a SMAC of assigning a reconstruction of the random terms and the outcome of the shuffle SHMC to a polynomial defined as: $\Pi_{j=1}^{m}(z-[x'_j]) - \Pi_{j=1}^{m}(z-[y'_j]) = c$, where $[x'_j]$, $[y'_j]$, comprise reconstructions of $[x'_j]_i$, $[y'_j]_i$, i=1 ... N respectively.

Next, as shown in 408, an SMAC may be executed by the processes in order to assign values to a logical equation defined as follows:

$$d = \prod_{j=1}^{m-1} 1_{j,I}, \text{ where } 1_{j,I} = \begin{cases} 1, & y_{j,I} \leq y_{j+1,I} \\ 0, & y_{j,I} > y_{j+1,I} \end{cases}$$

Next, as shown in 410, the processes execute a SMAC in order to reconstruct c and d from their respective shares of c and d, in order to verify that c=0 and that d=1. If c=0 and d=1, it is implied that with a certain probability the outcome of the sort SHMC is a sorting of the record rows according to a column with index I.

Next as shown in 412, when it is not verified that c=0 and d=1, then as shown in 414, an integrity error is returned, else, as shown in 416 when an iteration number is less than δ then a new iteration is executed, and when it is a final iteration then as shown in 418 an outcome is returned by each process comprising a respective shuffle SHMC output.

Figure 5:
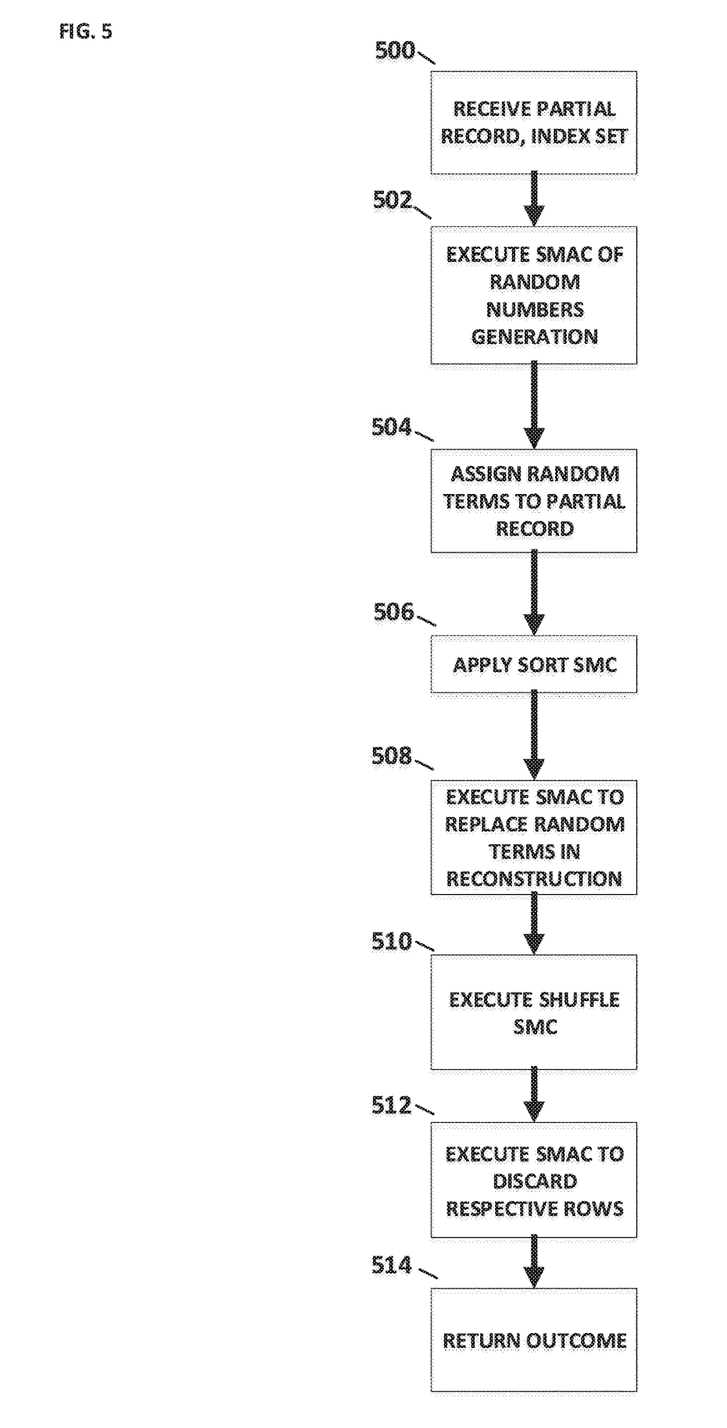
FIG. 5 is an exemplary dataflow of the distinct multiparty computation, according to some embodiments of the present invention.

Reference is also made to FIG. 5, which depicts an exemplary dataflow of the distinct SMC, according to some embodiments of the present invention. The distinct multiparty computation outputs a computed record consisting of rows which with a high probability comprise, as a set, of all rows of the record without duplications. For example, if the record is ((1,2), (1,2), (3,4)), then the distinct multiparty computation outputs ((1,2), (3,4)).

As shown in 500, a respective partial record is received by each process, by execution of the code in 204. In addition, an index set I is received, wherein uniqueness of values of the distinct SMC are imposed on sub-rows which are partial to record rows such that sub-row are derived from columns of the record with indices contained in I. Next, as shown in 502, random numbers of $\mathbb{F}$ are generated by the processes using the SMAC for a purpose of reducing a probability of incorrectly invalidating the integrity of the distinct multiparty computation outcome.

If k=1 then a column is added to each respective partial record consisting of $[x_{j,k+1}]_i=[x_{j,1}]_i$ for each process $P_i$, i=1 ... N, else |I|+1 random numbers of $\mathbb{F}$ are generated by the processes using the SMAC for a purpose of reducing a probability of incorrectly invalidating the integrity of the distinct SMC outcome. Since there are no restrictions on the structure of the record it can be assumed than 1 consists of consecutive numbers. Denote |I| by t, and the random numbers produced as $(\sigma_1, \ldots \sigma_t)$.

As shown in 504, the random terms comprise a summation assigned to an added column to each respective partial record by defining $[x'_{j,k+1}]_i=\Sigma_{l=1}^{t}\sigma_l[x_{j,l}]_i$, for j=1 ... m, for each process $P_i$, i=1 ... N, and are generated using a SMAC.

Next, as shown in 506, the sort SMC is applied to the partial records according to index k+1 comprising a respective column of assigned random terms, and each process is outputted an intermediate partial record consisting of a k×m matrix denoted as $(([y_{1,1}]_i, \ldots [y_{1,k}]_i), \ldots ([y_{m,1}]_i, \ldots [y_{m,k}]_i))$, for i=1 ... N, such that a reconstruction of the intermediate partial records results in a computed record comprising a sorting of the record according to combined assigned random terms of the column with index k+1.

Next, as shown in 508, a SMAC is applied by the processes in order to replace all values in the column of a reconstruction of the intermediate partial records with index k+1 with a first constant, which may be 0, and a second constant, which may be 1, as follows:

for all l∈{1 ... m−1}:
if $y_{l,k+1}=y_{l+1,k+1}$ assign $y_{l,k+1}=0$ else assign $y_{l,k+1}=1$.

Next, as shown in 510, the shuffle SMC is executed on the intermediate partial records in order to reduce the probability of a malicious party not being detected. Next, as shown in 512, an SMAC is executed in order to discard all respective rows of intermediate partial records for which a reconstruction of the intermediate partial records results in $y_{l,k+1}=0$, l∈{1 ... m−1}, which implies a duplicity between rows. Next, as shown in 514, an outcome is returned by each process, comprising a respective intermediate partial record.

Figure 6:
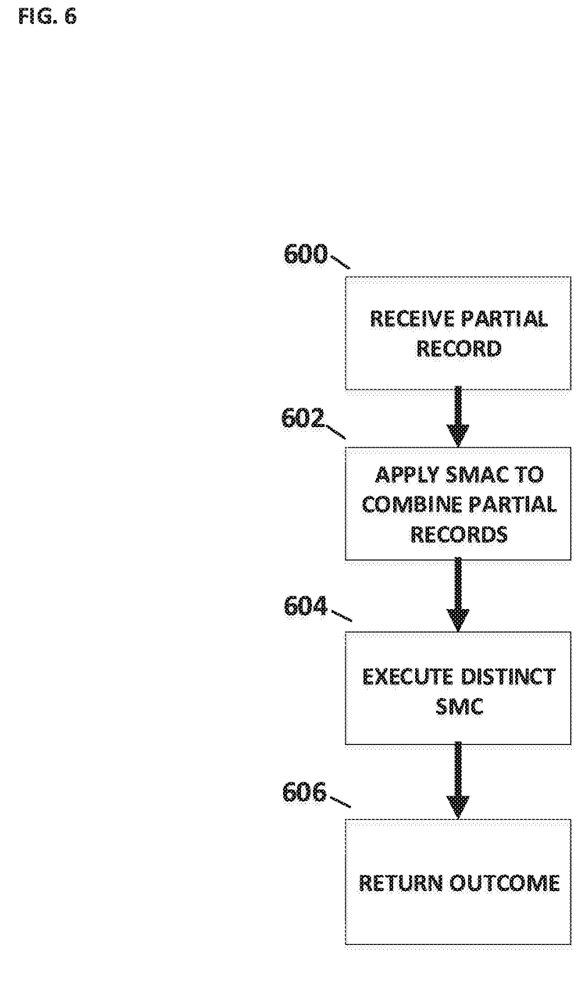
FIG. 6 is an exemplary dataflow of the union multiparty computation, according to some embodiments of the present invention.

Reference is also made to FIG. 6, which depicts an exemplary dataflow of the union SMC, according to some embodiments of the present invention. The union multiparty computation outputs a computed record consisting of rows which with a high probability comprise, as a set, a matrix comprising all rows of two matrices comprising the record without duplications. As shown in 600, a respective partial record comprising two matrices is received by each process, by execution of the code in 204. As shown in 602, an SMAC is applied in order to combine the two matrices of each respective process into a combined partial record comprising a combined matrix. Next, as shown in 604, the distinct SMC is applied to the combined matrices of the processes, which produces an output matrix for each process such that a reconstruction of the output matrices comprise a unified matrix containing all the rows of the record without duplication of rows. As shown in 606 a respective output matrix is returned by each process as an outcome of the union SMC.

Figure 7:
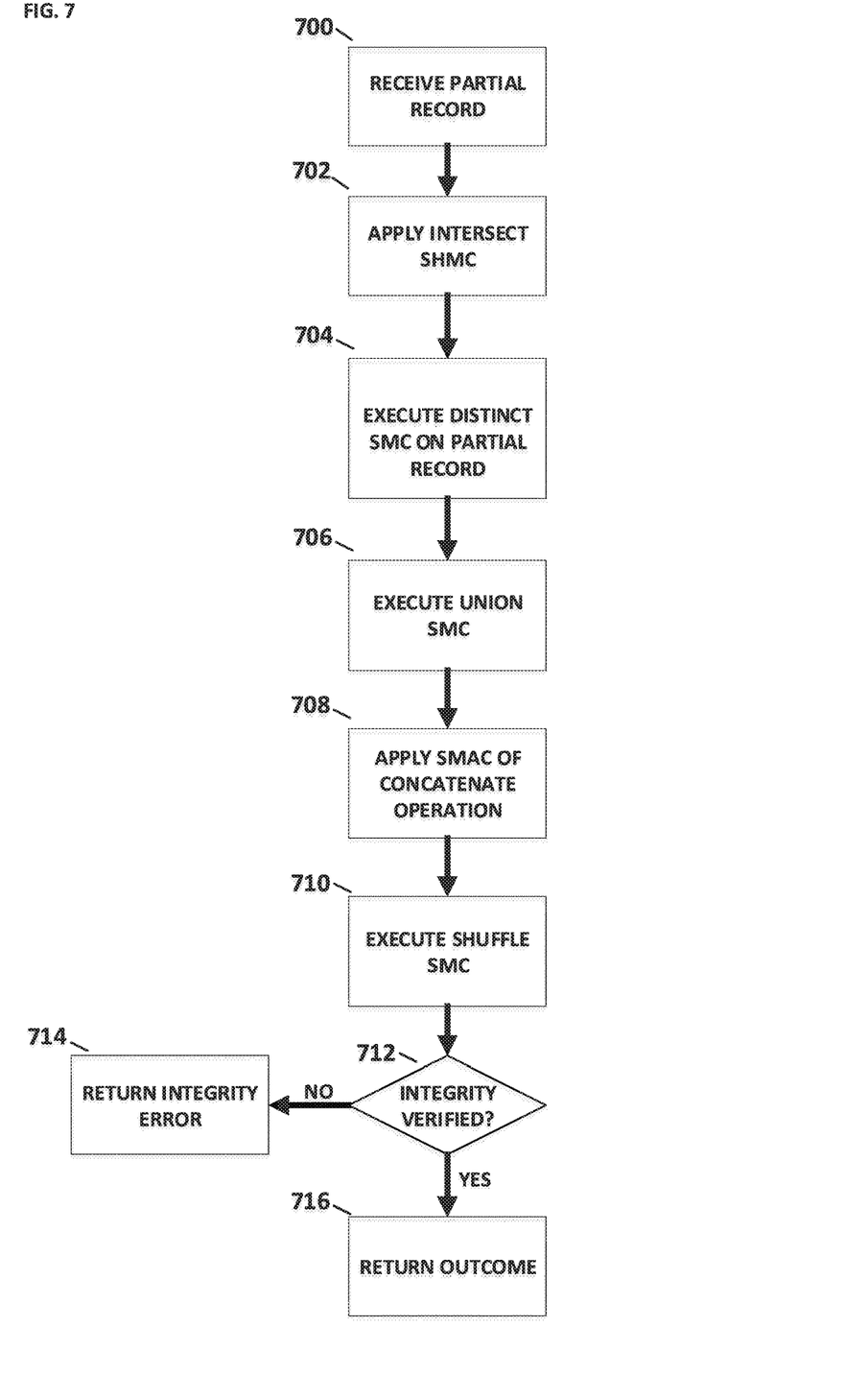
FIG. 7 is an exemplary dataflow of the intersect multiparty computation, according to some embodiments of the present invention.

Reference is also made to FIG. 7, which depicts an exemplary dataflow of the intersect SMC, according to some embodiments of the present invention. The intersect multiparty computation outputs a computed record consisting of rows which with a high probability comprise, as a set, a matrix comprising all rows of two matrices comprising the record which appear in both matrices. As shown in 700, a respective partial record comprising a first matrix and a second matrix is received by each process, by execution of the code in 204. As shown in 702, an intersect SHMC is applied to the respective partial records of all processes to obtain a respective third matrix for each process, such that a reconstruction of the third matrices of all processes consists of a matrix with rows which comprise, as a set, a matrix comprising all rows of two matrices comprising the record, which appear in both matrices. Next, the intersect SHMC is verified. As shown in 704, the distinct SMC is executed on a respective first matrix of all processes, and the distinct SMC is executed on a respective second matrix of all processes. A purpose of 704 is to eliminate a possibility for identifying duplicate rows in a first matrix or a second matrix of the record as belonging to an intersection of the first and second matrices of the record. Next, as shown in 706, the union SMC is applied to the first and second matrices to obtain a fourth matrix for each process.

As shown in 708, an SMAC is applied to a concatenate operation to an outcome of the distinct SMC on the first matrix and an outcome of the distinct multiparty computation on the second matrix to obtain a fifth matrix, and a concatenate operation is applied to the third matrix and the fourth matrix to obtain a sixth matrix. Note that if all parties follow the intersect SHMC and no deviation from other SMC's are detected then the fifth matrix and the sixth matrix contain identical rows. As shown in 710, the shuffle SMC is applied, in a modified manner, by each process inputting the fifth matrix in the shuffle SMC and employing the sixth matrix instead of the SHMC shuffle computation in order to verify that the fifth and sixth matrix have identical rows. Next, as shown in 712, when an integrity of the intersect SHMC is not verified, then as shown in 714, an integrity error is returned, else, as shown in 716 an outcome comprising a respective intersect SHMC output is returned by each process.

Figure 8:
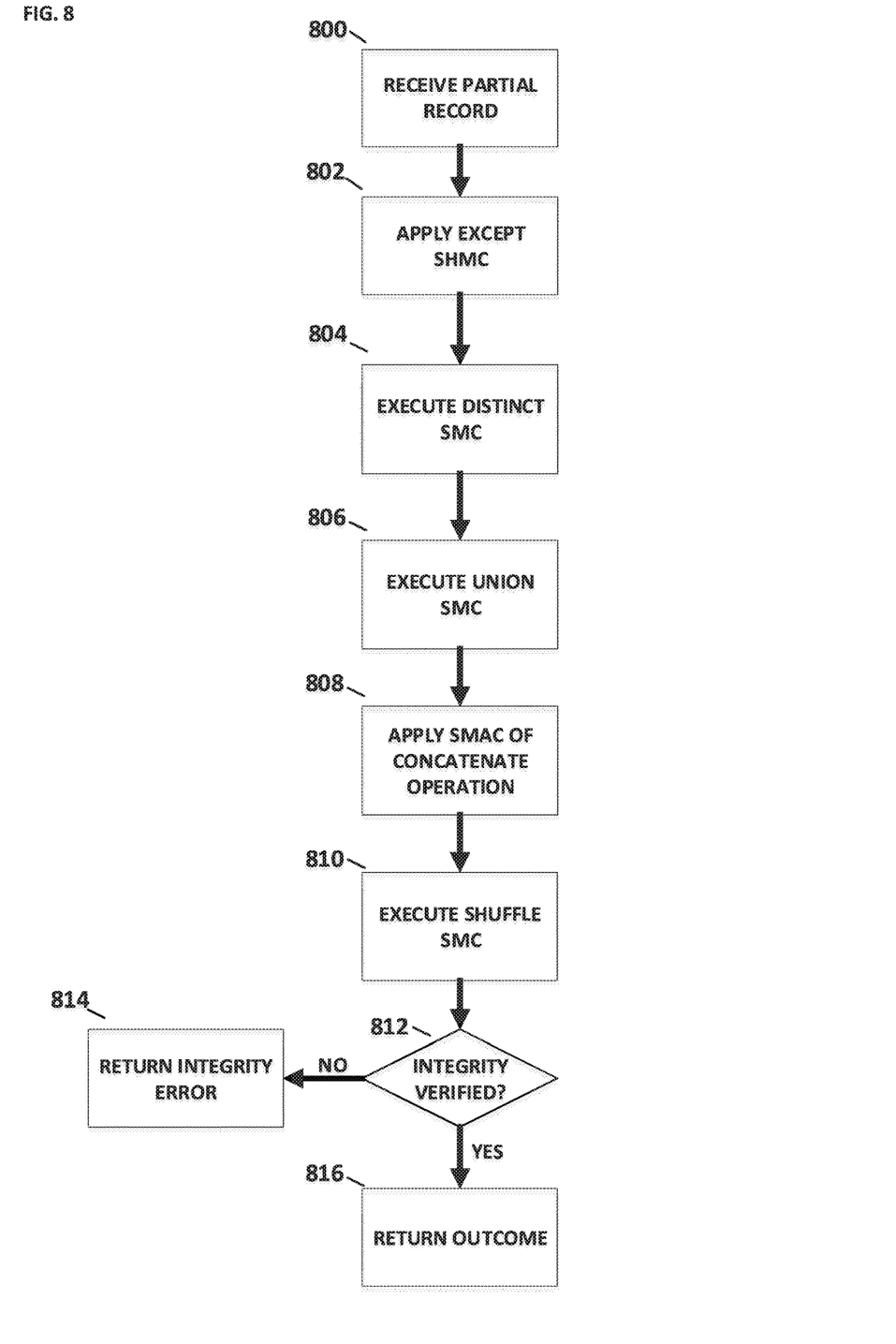
FIG. 8 is an exemplary dataflow of the except multiparty computation, according to some embodiments of the present invention.

Reference is also made to FIG. 8, which an exemplary dataflow of the except SMC, according to some embodiments of the present invention. The except SMC receives a record comprising a first and second matrix, and outputs a computed record consisting of non-duplicate rows which are contained in the first matrix and not contained in the second matrix. As shown in 800, a respective partial record comprising a first matrix and a second matrix is received by each process, by execution of the code in 204. As shown in 802, an except SHMC is applied to the respective partial records of all processes to obtain a respective third matrix for each process, such that a reconstruction of the third matrices of all processes consists of a matrix with non-duplicate rows which are contained in the first matrix of the record and not contained in the second matrix of the record. Next, the except SHMC is verified as follows. As shown in 804, the distinct SMC is executed on a respective second matrix of all processes. Next, as shown in 806, the union SMC is applied to the first and second matrices to obtain a fourth matrix for each process.

As shown in 808, an SMAC is applied to a concatenate operation to the third matrix and the outcome of the distinct multiparty computation on the second matrix of all processes to obtain a fifth matrix for each process. Note that if all parties follow the except SHMC and no deviation from other SMC's are detected then the fourth matrix and the fifth matrix contain identical rows. As shown in 810, the shuffle SMC is applied, in a modified manner, by each process inputting the fourth matrix in the shuffle SMC and employing the fifth matrix instead of the SHMC shuffle computation in order to verify that the fourth and fifth matrix have identical rows. Next, as shown in 812, when an integrity of the intersect SHMC is not verified, then as shown in 814, an integrity error is returned, else, as shown in 816 an outcome comprising a respective except SHMC output is returned by each process.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term secure multiparty computation is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for performing secure computations on records, comprising:
   receiving a request to apply a computation on a record;
   assigning a respective partial record of a plurality of partial records of the record to each of a plurality of computational processes;
   instructing each of the plurality of computational processes to perform a computation scheme comprising:
      applying one of a plurality of semi honest multiparty computations on the partial record;
      iteratively repeating a predetermined number of times:
         using a secure multiparty arithmetic computation to generate random terms;
         using the secure multiparty arithmetic computation to assign the random terms and an outcome of the application to at least one predetermined equation;
         verifying an integrity of at least one application of the semi honest multiparty computations by comparison of the assignments to the at least one predetermined equation to at least one constant; and when the detected integrity is valid, calculating a response to the request by combining the applications of the semi honest multiparty computations on the partial records;

wherein the record and each partial record comprise a matrix of predetermined size comprising elements of a finite algebraic field;

wherein the secure multiparty arithmetic computation comprises a plurality of the following operations:

a multiplication of an input by a scalar, a summation of two inputs, a multiplication of two inputs, and a comparison between two inputs;

wherein the random terms are generated as randomly generated elements of the finite algebraic field and summations of randomly generated elements of the finite algebraic field multiplied by matrix entries of respective partial records;

wherein the computation scheme comprises a sorting multiparty computation as follows:

applying a semi honest multiparty sorting computation on the partial record according to the preassigned index such that the sorting computation performs a sorting of matrix rows of the record according to a preassigned column index;

iteratively repeating a predetermined number of times:

using the secure multiparty arithmetic computation to generate random terms;

assigning the random terms and an outcome of the application to a predetermined polynomial and a predetermined logical term; and verifying an integrity of at least one application of the semi honest multiparty computations by comparing the assignments to the predetermined polynomial to a first constant and by comparing the assignments to the predetermined logical term to a second constant.

2. The method of claim 1, wherein the computation scheme comprises a shuffle multiparty computation as follows:

applying a semi honest multiparty shuffle computation on the partial record such that the shuffle computation permutes between respective partial record matrix entries of all computational processes;

iteratively repeating a predetermined number of times:

using the secure multiparty arithmetic computation to generate random terms;

using the secure multiparty arithmetic computation to assign the random terms and an outcome of the application to a polynomial equation; and verifying an integrity of at least one application of the semi honest multiparty computations by comparing the assignments to the polynomial equation to a constant.

3. The method of claim 2, wherein the computation requested to be applied on the record is a distinct multiparty computation performed as follows:

using the secure multiparty arithmetic computation to generate random terms according to a predetermined set of indices;

assigning the random terms to respective matrix rows;

applying the sorting multiparty computation on the partial record according to the assigned random terms;

using the secure multiparty arithmetic computation to replace all combined assigned random terms with a first constant in a case that a consecutive combined random term is of equal value, and with a second constant in a case that a consecutive combined random term is of different value;

applying the shuffle multiparty computation to the outcome of the application of the sorting multiparty computation with respective replaced assigned random terms to obtain an intermediate partial record;

using the secure multiparty arithmetic computation to combine assigned random terms in the intermediate partial record;

discarding all rows in the intermediate partial record for which respective combined random terms are equal to the first constant; and using the secure multiparty arithmetic computation to output a combination of intermediate partial records.

4. The method of claim 3, wherein the computation requested to be applied on the record comprising two matrices is a union multiparty computation performed as follows:

using the secure multiparty arithmetic computation to combine the two matrices into a combined matrix;

using the distinct multiparty computation on the combined matrix; and outputting the outcome of the distinct multiparty computation.

5. The method of claim 4, wherein the computation requested to be applied on the record is an intersect multiparty computation, and each partial record comprises a first matrix and a second matrix, performed as follows:

applying a semi honest multiparty intersect computation on the partial record to obtain a third matrix;

using the distinct multiparty computation on the first matrix;

using the distinct multiparty computation on the second matrix;

using the union multiparty computation on the first and second matrices to obtain a fourth matrix;

applying a concatenate operation to an outcome of the distinct multiparty computation on the first matrix and an outcome of the distinct multiparty computation on the second matrix to obtain a fifth matrix;

applying a concatenate operation to the third matrix and the fourth matrix to obtain a sixth matrix; and verifying an integrity by using the fifth matrix and the sixth matrix as respective input and output in the shuffle multiparty computation.

6. The method of claim 5, wherein the computation requested to be applied on the record is an except multiparty computation, and each partial record comprises a first matrix and a second matrix, performed as follows:

applying a semi honest multiparty except computation on the partial record to obtain a third matrix;

using the distinct multiparty computation on the second matrix;

using the union multiparty computation on the first and second matrices to obtain a fourth matrix;

applying a concatenate operation to the third matrix and an outcome of the distinct multiparty computation on the second matrix to obtain a fifth matrix;

applying a concatenate operation to the third matrix and the fourth matrix to obtain a sixth matrix; and verifying an integrity by using the fourth matrix and the fifth matrix as respective input and output in the shuffle multiparty computation.

7. A system for performing secure computations on records, comprising:

at least one electronic circuitry adapted to perform the following:

receiving a request to apply a computation on a record;
assigning a respective partial record of a plurality of partial records of the record to each of a plurality of computational processes;
instructing each of the plurality of computational processes to perform a computation scheme comprising:
  applying one of a plurality of semi honest multiparty computations on the partial record;
  iteratively repeating a predetermined number of times:
    using a secure multiparty arithmetic computation to generate random terms;
    using the secure multiparty arithmetic computation to assign the random terms and an outcome of the application to at least one predetermined equation;
    verifying an integrity of at least one application of the semi honest multiparty computations by comparison of the assignments to the at least one predetermined equation to at least one constant; and
when the detected integrity is valid, calculating a response to the request by combining the applications of the semi honest multiparty computations on the partial records;
wherein the record and each partial record comprise a matrix of predetermined size comprising elements of a finite algebraic field;
wherein the secure multiparty arithmetic computation comprises a plurality of the following operations:
a multiplication of an input by a scalar,
a summation of two inputs,
a multiplication of two inputs, and
a comparison between two inputs;
wherein the random terms are generated as randomly generated elements of the finite algebraic field and summations of randomly generated elements of the finite algebraic field multiplied by matrix entries of respective partial records;
wherein the computation scheme comprises a sorting multiparty computation as follows:
applying a semi honest multiparty sorting computation on the partial record according to the preassigned index such that the sorting computation performs a sorting of matrix rows of the record according to a preassigned column index;
iteratively repeating a predetermined number of times:
  using the secure multiparty arithmetic computation to generate random terms;
  assigning the random terms and an outcome of the application to a predetermined polynomial and a predetermined logical term; and
verifying an integrity of at least one application of the semi honest multiparty computations by comparing the assignments to the predetermined polynomial to a first constant and by comparing the assignments to the predetermined logical term to a second constant.

* * * * *